United States Patent
Okabe

(10) Patent No.: US 6,707,617 B2
(45) Date of Patent: Mar. 16, 2004

(54) TELECENTRIC LENS SYSTEM AND IMAGE MEASURING DEVICE

(75) Inventor: Kenji Okabe, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/354,678

(22) Filed: Jan. 30, 2003

(65) Prior Publication Data

US 2003/0151823 A1 Aug. 14, 2003

(30) Foreign Application Priority Data

Feb. 13, 2002 (JP) ........................................ 2002-035922

(51) Int. Cl.[7] .............................................. G02B 13/22
(52) U.S. Cl. ........................ 359/663; 359/738; 359/739
(58) Field of Search ................................ 359/663, 793, 359/738–740

(56) References Cited

U.S. PATENT DOCUMENTS 5,625,495 A * 4/1997 Moskovich .................. 359/663
6,560,012 B2 * 5/2003 Adachi et al. ............... 359/740

OTHER PUBLICATIONS

"Telecentric Optice for Computational Vision", M. Watanabe and S.K. Nayar. Proceedings of Image Understanding Workshop (IUW 96), Palm Springs, Feb. 1996.

* cited by examiner

Primary Examiner—Georgia Epps
Assistant Examiner—M. Hasan
(74) Attorney, Agent, or Firm—Rankin, Hill, Porter & Clark LLP

(57) ABSTRACT

A telecentric lens system including a front lens unit, a rear lens unit that is disposed so that the front focal point of the rear lens unit coincides with the back focal point of the front lens unit, and a diaphragm mechanism that is disposed at the location where the back focal point of the front lens unit and the front focal point of the rear lens unit coincide. The diaphragm mechanism includes a numerical aperture changer for changing the numerical aperture of the diaphragm mechanism. By changing the numerical aperture, the telecentric lens system can be used in a wide range of applications from observations requiring a large focal depth to observations requiring high resolution. The telecentric lens system that can be used in observations for a wide range of applications and an image measuring device including the telecentric lens system.

12 Claims, 5 Drawing Sheets

TELECENTRIC LENS SYSTEM AND IMAGE MEASURING DEVICE

BACKGROUND OF THE INVENTION

1. Field of the Invention

The present invention relates to a telecentric lens system and an image measuring device.

2. Description of Related Art

What is called a double telecentric lens system is known. The double telecentric lens system comprises two lens units, a front lens unit and a rear lens unit, with the back focal point of the front lens unit and the front focal point of the rear lens unit being disposed so that they coincide, and a diaphragm disposed at the location where these two focal points coincide.

In the double telecentric lens system, the field of view of an object is wide, the focal depth is large, and the imaging magnification is determined by the focal lengths of the front lens unit and the rear lens unit regardless of the position of the object. Therefore, the telecentric lens system is frequently used to observe objects having stepped portions, such as edge tools, mechanical parts, and assembled electronic parts.

However, in the telecentric lens system, in principle, the resolution and the focal depth are inversely proportional to each other. In other words, when the focal depth is increased, the resolution is reduced. In order to observe an object with higher resolution after setting a large focal depth once, it is necessary to either change the lens being used to one having a higher magnification or separately observe an object with a microscope having high resolution. Changing lenses and separately using a microscope make it more troublesome to observe an object, thereby making the operation for observing the object complicated, so that operation efficiency is reduced. In addition, separately providing a lens or a microscope is costly.

SUMMARY OF THE INVENTION

Accordingly, it is an object of the present invention to overcome the aforementioned related problems, and to provide a telecentric lens system that can be used in observations for a wide range of applications and an image measuring device.

To this end, according to one aspect of the present invention, there is provided a telecentric lens system comprising a front lens unit; a rear lens unit that is disposed so that the front focal point of the rear lens unit coincides with the back focal point of the front lens unit; and a diaphragm mechanism that is disposed at the location where the back focal point of the front lens unit and the front focal point of the rear lens unit coincide, and which comprises a numerical aperture changer for changing the numerical aperture of the diaphragm mechanism.

According to such a structure, since the diaphragm mechanism comprises a numerical aperture changer, the numerical aperture can be changed. In the telecentric lens system, the focal depth and the resolution are inversely proportional to each other. When the numerical aperture is reduced by the numerical aperture changer, the resolution is low, but the focal depth is large. In other words, an object having a stepped portion can be observed clearly and measured. On the other hand, when the numerical aperture is increased by the numerical aperture changer, the focal depth becomes small, but the resolution is high. In other words, an object can be observed and measured with precision and high resolution.

By changing the numerical aperture by the numerical aperture changer, the telecentric lens system can be used in a wide range of applications from those requiring a large focal depth to those requiring high resolution. Therefore, one telecentric lens system can be successively used for observations for different applications. As a result, operation efficiency is remarkably increased. In addition, since it is not necessary to separately provide, for example, a microscope according to the type of application, costs can be reduced.

In a first form based on the one aspect, the numerical aperture changer has at least two diaphragms having numerical apertures that differ successively, and, by changing one diaphragm with another diaphragm, the numerical aperture is changed.

According to such a structure, the numerical aperture can be changed by changing a diaphragm with one having a different numerical aperture. Therefore, one telecentric lens system can be successively used for observations for different applications (such as, applications requiring large focal depths or high resolution). As a result, operation efficiency can be increased. In addition, since it is not necessary to separately provide a microscope, costs can be reduced.

If a plurality of diaphragms having previously specified numerical apertures are provided and optical features (such as focal depth and resolution) in terms of the numerical apertures of the respective diaphragms are known, optimal numerical apertures can be easily selected according to various objects to be observed and various applications. Since the optical features are known when, for example, an observed image is processed and measured, the image can be optimally measured.

In a second form based on the first form, the diaphragms are successively provided in one plate, and, by moving the plate, the numerical aperture is changed.

The diaphragms may be provided in one row in one plate or along the circumference of one plate. According to such a structure, the numerical aperture can be changed by moving the plate. Therefore, the structure is simple, and observations for different applications can be successively carried out using one telecentric lens system by only simply moving the plate, so that operation efficiency can be increased.

In a third form based on the first form, the diaphragms are provided in swingably supported levers, respectively, and, by movement of any one of the levers, the numerical aperture is changed.

It is desirable that the levers are provided perpendicular to the optical axis and be supported so that they swing within a plane that is perpendicular to the optical axis. In addition, it is desirable that the levers having different numerical apertures be disposed along the optical axis.

According to such a structure, if a lever having the desired numerical aperture is moved, so that the diaphragm is disposed on the optical axis, the numerical aperture is changed. By selecting the numerical aperture according to the object to be observed and the type of application, observations for different applications can be successively carried out using one telecentric lens system, so that operation efficiency can be increased.

In a fourth form based on the one aspect, the numerical aperture changer comprises an iris diaphragm for successively changing the numerical aperture.

According to such a structure, by adjusting the shutter of the iris diaphragm, the numerical aperture can be successively changed. Since the numerical aperture can be successively changed, the numerical aperture can be adjusted to an optimal numerical aperture according to the type of application. Therefore, observations for different applications, such as an observation requiring a large focal depth or that requiring a high resolution, can be successively carried out using one telecentric lens system. As a result, operation efficiency can be increased. Since it is not necessary to separately provide a microscope according to the type of application, costs can be reduced.

In a fifth form based on the one aspect to the fourth form, either the front lens unit or the rear lens unit is changeable.

According to such a structure, by the numerical aperture changer, observations ranging from those requiring a large focal depth to those required high resolution can be carried out. In addition, by changing lens units, the setting range of focal depths and the setting range of resolutions can be increased. Conventionally, when a numerical aperture changer is not provided, the focal depth and the resolution are uniquely determined for one lens unit. Therefore, in order to provide a wide range of focal depths and resolutions, it is necessary to provide a large number of lens units. However, in the present invention, by the numerical aperture changer, the setting range of focal lengths and the setting range of resolutions of one lens unit can be increased, so that the number of lens units that are provided can be reduced. Therefore, it is possible to reduce costs for carrying out observations and measurements for a wide range of focal lengths and resolutions.

According to another aspect of the present invention, there is provided an image measuring device comprising the telecentric lens system of any one of the one aspect to the fifth form, and an imaging optical system that is connected to the telecentric lens system.

According to such a structure, an image measuring device that provides the advantages of the telecentric lens systems of the one aspect to the fifth forms can be provided. In other words, observations for different applications can be successively carried out using one image measuring device. As a result, operation efficiency is remarkably increased. In addition, since it is not necessary to separately provide an image measuring device according to the type of application, costs can be reduced.

DESCRIPTION OF THE PREFERRED EMBODIMENTS

Hereunder, a description of preferred embodiments of the present invention will be given with reference to the drawings.

Figure 1:
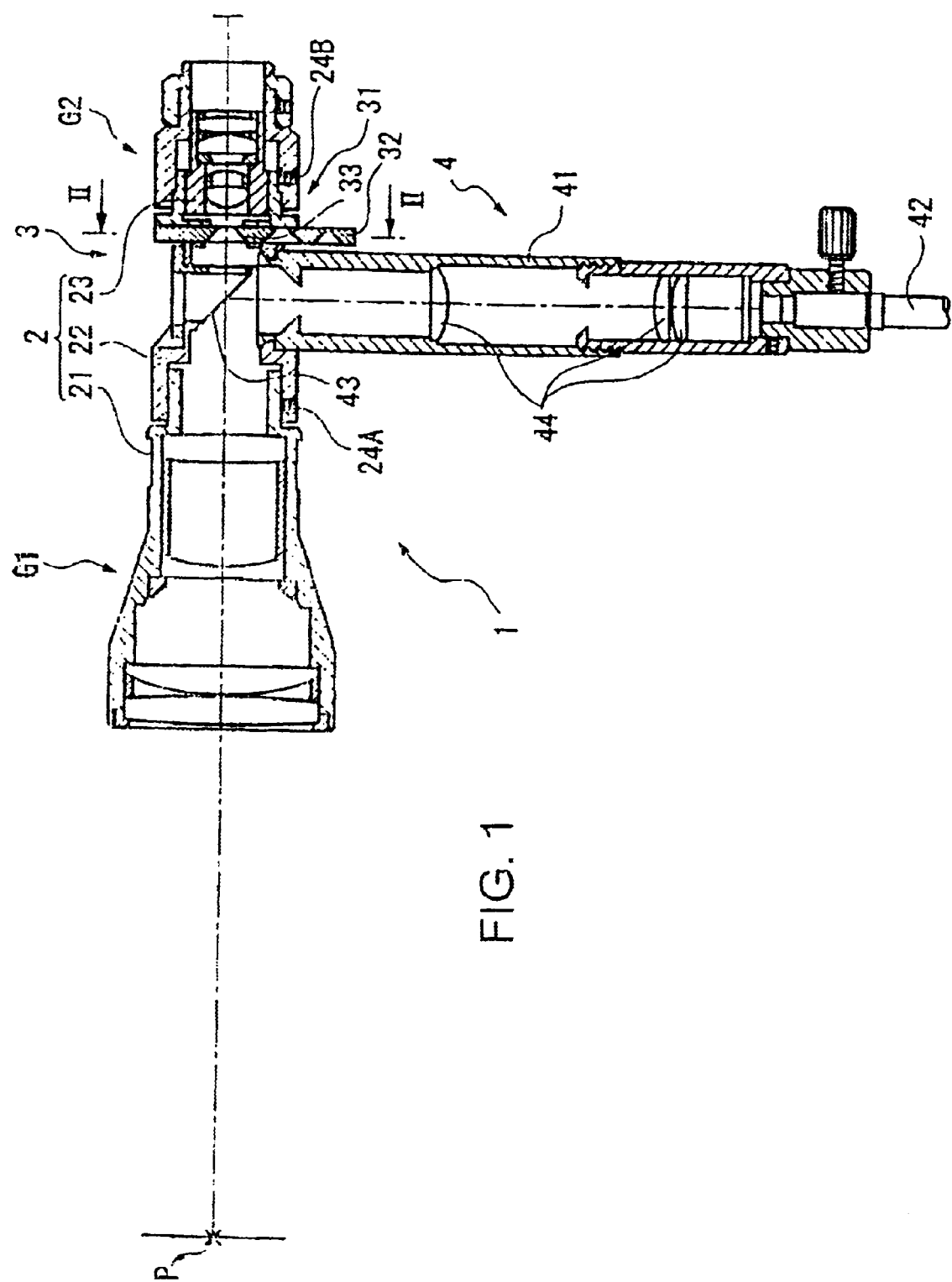
FIG. 1 shows a telecentric lens system and an image measuring device of a first embodiment of the present invention.

FIG. 1 shows an image measuring device using a telecentric lens system of a first embodiment of the present invention.

An image measuring device 1 comprises a cylindrical lens barrel 2 having a space at the inside thereof, a telecentric lens system 3 that is formed inside the lens barrel 2, and an illumination optical section 4 that is provided perpendicular to the lens barrel 2.

The lens barrel 2 comprises a front cylindrical section 21, a middle cylindrical section 22, and a rear cylindrical section 23. The middle cylindrical section 22 is connected to the back of the front cylindrical section 21, and the rear cylindrical section 23 is connected to the back of the middle cylindrical section 22. The connection portions are anchored by respective pins 24A and 24B, and are removably provided. An imaging optical system (not shown), such as a charge-coupled device (CCD) or a camera, is mounted to an opening that is formed in the back portion of the rear cylindrical section 23.

The telecentric lens system 3 comprises a front lens unit G1, a rear lens unit G2, and a diaphragm mechanism 31.

The front lens unit G1 comprises a convex lens, a concave lens, and a lens subunit having a convex lens and a concave lens cemented together. It comprises lenses whose telecentricities and various aberrations have been properly corrected. The rear lens unit G2 comprises a convex lens, a concave lens, and a lens subunit having a convex lens and a concave lens cemented together. It comprises lenses whose telecentricities and various aberrations have been properly corrected. Incidentally, lens combinations for correcting telecentricity and various aberrations are disclosed in, for example, Japanese Patent Application No. 2001-185241 by the applicant.

The front lens unit G1 is disposed in the front cylindrical section 21, and the rear lens unit G2 is disposed in the rear cylindrical section 23. The front lens unit G1 and the rear lens unit G2 are disposed so that the back focal point of the front lens unit G1 and the front focal point of the rear lens unit G2 coincide.

Figure 2:
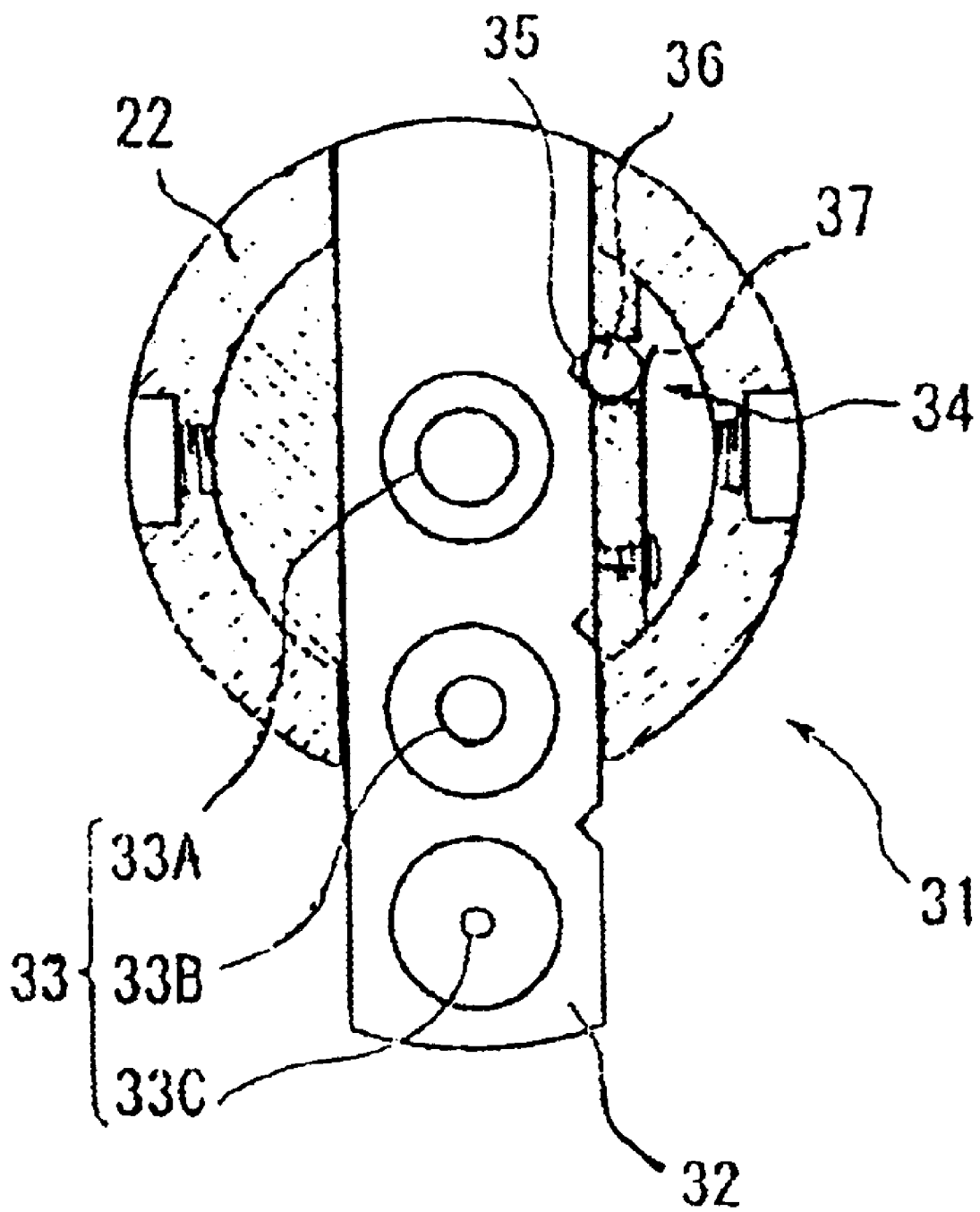
FIG. 2 is a sectional view taken along line II-II of FIG. 1.

The diaphragm mechanism 31 is provided at the middle cylindrical section 22. FIG. 2 shows the diaphragm mechanism 31. The diaphragm mechanism 31 comprises a plate 32 slidably disposed perpendicular to a cylindrical hole of the middle cylindrical section 22, diaphragms 33 disposed in a row in the plate 32 and having diameters that differ gradually, and a positioning mechanism 34 (FIG. 2) for positioning the plate 32.

With reference to FIG. 2, there are three diaphragms 33, or, more specifically, a large aperture diaphragm 33A having a large diameter, an intermediate aperture diaphragm 33B having an intermediate diameter, and a small aperture diaphragm 33C having a small diameter. The diameter of each diaphragm 33 increases towards the front. The diameter of the back portion of each diaphragm 33 corresponds to the numerical aperture of each diaphragm 33.

The positioning mechanism 34 comprises v-shaped cutaway sections 35, disposed in a side surface of the plate 32 so as to allow each diaphragm 33 to be positioned on the optical axis, a ball 36 engaging any one of the cutaway sections 35, and a plate spring 37 for urging the ball 36 against the plate 32.

Accordingly, a numerical aperture changer is formed by the diaphragms 33 having different diameters and the positioning mechanism 34.

With reference to FIG. 1, the illumination optical section 4 comprises an illumination cylindrical section 41 having one end that is perpendicular to the middle cylindrical section 22 and passing through and being attached to the inside portion of the middle cylindrical section 22; an optical fiber 42 connected to the other end of the illumination cylindrical section 41; a beam splitter 43, disposed inside the middle cylindrical section 22, for reflecting light from the illumination cylindrical section 41 towards the front lens unit G1; and relay lenses 44 for focusing the light.

The optical fiber 42 is connected to a light source (not shown) and is used to guide light from the light source into the illumination cylindrical section 41.

Figure 3:
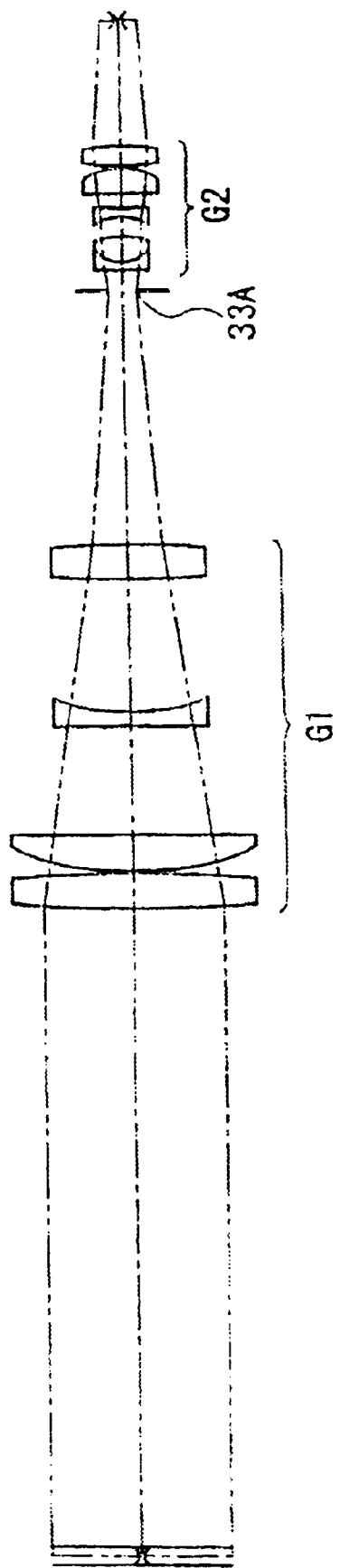
FIG. 3 shows an example in which a large aperture diaphragm is used in the embodiment.
Figure 4:
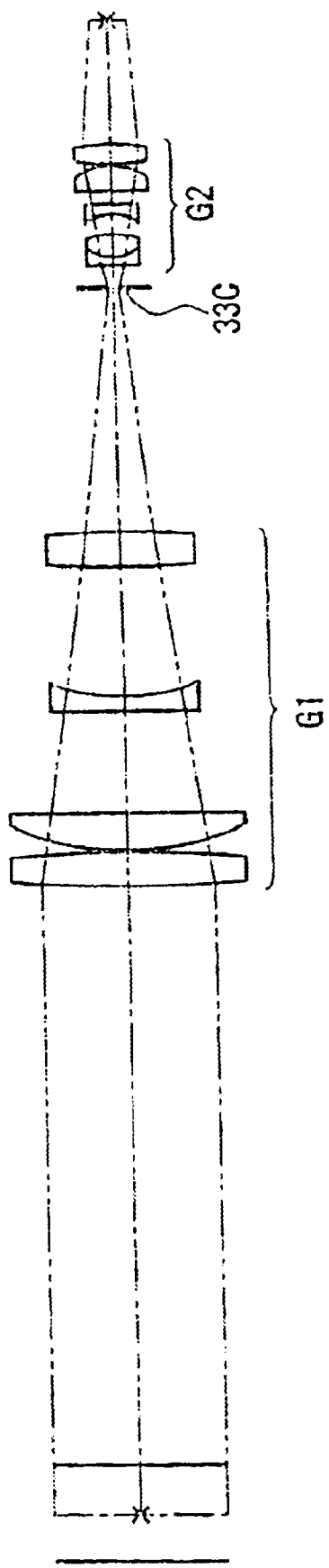
FIG. 4 shows an example in which a small aperture diaphragm is used in the embodiment.

In such a structure, an object to be observed is disposed at a point P in FIG. 1. Light emitted from the optical fiber 42 passes through the relay lenses 44, and is reflected by the beam splitter 43. Then, the reflected light passes through the front lens unit G1, and illuminates the object to be measured. The light from the object passes through the front lens unit G1 and the beam splitter 43. Thereafter, the light is reduced in amount by the diaphragm 33 (i.e., one of 33A, 33B, 33C). The reduced amount of light is incident upon the rear lens unit G2 and is imaged by the imaging optical system. At this time, as shown in FIG. 3, when the plate 32 is moved to set the large aperture diaphragm 33A, an image having a high resolution is provided because the numerical aperture is large. On the other hand, as shown in FIG. 4, when the small aperture diaphragm 33C is set, an image having a large focal depth is provided because the numerical aperture is small.

According to such a structure, by moving the plate 32, the numerical aperture can be changed. By changing the numerical aperture, the focal depth and the resolution can be changed. For example, when a bumpy object is observed, the numerical aperture can be made small in order to increase the focal depth. Therefore, it is possible to take a clear picture of the bumpy object. On the other hand, when an object is to be observed with high resolution, the numerical aperture can be made large. Therefore, the object can be observed with precision. In this way, using one image measuring device 1, the focal depth and resolution can be changed in accordance with the type of object and application. As a result, it is possible to increase operation efficiency. Since it is not necessary to provide a plurality of image measuring devices in accordance with the type of object and application, costs can be reduced.

Since the numerical apertures of the diaphragm mechanism are previously determined with three values, the optical feature in terms of each numerical aperture can be previously determined. Therefore, it is possible to easily select a suitable numerical aperture according to the type of object and application, and to optimally measure an image-by-image processing.

Since the front cylindrical section 21 and the rear cylindrical section 23 are removably provided, it is possible to easily change the front lens unit G1 along with the front cylindrical section 21, and the rear lens unit G2 along with the rear cylindrical section 23. Therefore, it is possible to set a much wider range of focal depths and resolutions.

Modifications may be made in the first embodiment. For example, the diaphragms 33 may be formed with circular shapes at a circular plate 32. Even with this structure, the numerical aperture can be changed by a revolving method.

The structure used in a second embodiment of the present invention is basically the same as that used in the first embodiment. The second embodiment differs from the first embodiment in the structure of a diaphragm mechanism 31.

Figure 5:
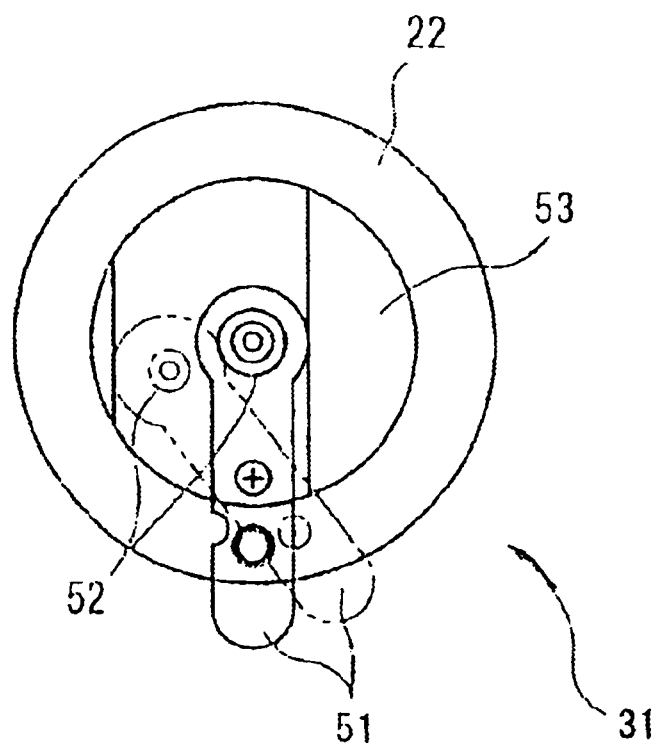
FIG. 5 shows a diaphragm mechanism used in a second embodiment of the present invention.

FIG. 5 shows the diaphragm mechanism 31 used in the second embodiment. The diaphragm mechanism 31 comprises a plurality of levers 51, which are swingably supported with respect to the middle cylindrical section 22, and diaphragms 52, which are provided in the respective levers 51 and which have different diameters. A numerical aperture changer is formed by the levers 51 and the diaphragms 52 having different diameters. The levers 51 are disposed side by side in the direction of the optical axis, and are supported so as to be swingable within a plane that is perpendicular to the optical axis. When an end of any one of the levers 51 comes into contact with a positioning plate 53, provided inside the middle cylindrical section 22, the position of the lever 51 is fixed, so that the diaphragm 52 is positioned on the optical axis. According to such a structure, by moving the levers 51, the numerical aperture can be changed. Therefore, the numerical aperture can be adjusted to an optimal numerical aperture according to the type of object to be measured and application.

The direction in which each lever swings may be parallel to the optical axis.

The structure used in a third embodiment of the present invention is basically the same as that used in the first embodiment. The third embodiment differs from the first embodiment in the structure of a diaphragm mechanism 31.

Figure 6:
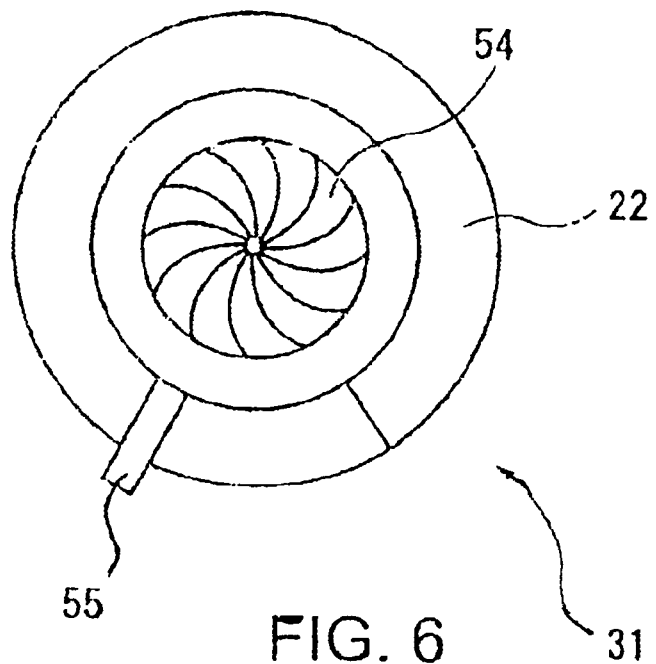
FIG. 6 shows a diaphragm mechanism used in a third embodiment of the present invention.

FIG. 6 shows a diaphragm mechanism 31 used in the third embodiment. In the diaphragm mechanism 31, a plurality of vanes 54 are superimposed upon each other, one end of each vane 54 slidably engaging an inner peripheral groove that is formed along the inner periphery of the middle cylindrical section 22, and an iris diaphragm is formed as a numerical aperture changer. By changing the angles of the vanes 54 by the levers 55 connected to the respective vanes 54, the numerical aperture can be successively changed. According to such a structure, since the numerical aperture can be successively changed, it can be adjusted to an optimal numerical aperture according to the type of object to be observed and type of application.

The telecentric lens system 3 and the image measuring device 1 of the present invention are not limited to those of the above-described embodiments, so that, obviously, various modifications may be made within a scope not departing from the gist of the present invention.

A drive source, such as a motor, may be provided at the numerical aperture changer in order to change the numerical aperture by the drive source. In addition, the driving operation of the drive source may be controlled by, for example, a computer. When this is done, the present invention is applicable to, for example, automatic observations or in-line measurements.

The diaphragm mechanisms 31 are not limited to those of the above-described embodiments. Any diaphragm mechanism 31 may be used as long as it can change the numerical aperture.

As described above, the telecentric lens system and the image measuring device of the present invention provide excellent advantages such as the capability of adjusting the focal depth and resolution and the capability of being used in a wide range of observational applications.

What is claimed is:

1. A telecentric lens system comprising:
   a front lens unit comprising a plurality of lenses that are adapted to receive light from an object being imaged and focus said received light at a back focal point of the front lens unit;
   a rear lens unit comprising a plurality of lenses, said rear lens unit being disposed so that a front focal point of the rear lens unit coincides with the back focal point of the front lens unit; and
   a diaphragm mechanism that is disposed at a location where the back focal point of the front lens unit and the front focal point of the rear lens unit coincide, said diaphragm mechanism comprising a numerical aperture changer for changing a numerical aperture of the diaphragm mechanism so as to selectively switch between a first imaging mode and a second imaging mode, said first imaging mode having a first resolution and a first focal depth and said second imaging mode having a second resolution and a second focal depth, and wherein said first resolution is greater than said second resolution and said first focal depth is less than said second focal depth.

2. The telecentric lens system according to claim 1, wherein the numerical aperture changer includes at least two diaphragms having numerical apertures that differ successively, and wherein, by changing a first of said at least two diaphragms with a second of said at least two diaphragms, the numerical aperture is changed.

3. The telecentric lens system according to claim 2, wherein the diaphragms are successively provided in one plate, and wherein, by moving the plate, the numerical aperture is changed.

4. A telecentric lens system according to claim 2, further comprising at least two swingably supported levers, wherein said first diaphragm is provided in one of the swingably supported levers and said second diaphragm is provided in another of the swingably supported levers, and wherein the numerical aperture is changed by movement of any of the levers.

5. The telecentric lens system according to claim 1, wherein the numerical aperture changer comprises an iris diaphragm for successively changing the numerical aperture.

6. The telecentric lens system according to claim 1, wherein at least one of the front and rear lens units is changeable.

7. An image measuring device comprising:
 a telecentric lens system comprising:
  a front lens unit comprising a plurality of lenses that are adapted to receive light from an object being imaged and focus said received light at a back focal point of the front lens unit;
  a rear lens unit comprising a plurality of lenses, said rear lens unit being disposed so that a front focal point of the rear lens unit coincides with the back focal point of the front lens unit; and
  a diaphragm mechanism that is disposed at a location where the back focal point of the front lens unit and the front focal point of the rear lens unit coincide, said diaphragm mechanism comprising a numerical aperture changer for changing a numerical aperture of the diaphragm mechanism, so as to selectively switch between a first imaging mode and a second imaging mode, said first imaging mode having a first resolution and a first focal depth and said second imaging mode having a second resolution and a second focal depth, and wherein said first resolution is greater than said second resolution and said first focal depth is less than said second focal depth; and
 an imaging optical system that is connected to the telecentric lens system.

8. The image measuring device according to claim 7, wherein the numerical aperture changer includes at least two diaphragms having numerical apertures that differ successively, and wherein, by changing a first of said at least two diaphragms with a second of said at least two diaphragms, the numerical aperture is changed.

9. The image measuring device according to claim 8, wherein the diaphragms are successively provided in one plate, and wherein, by moving the plate, the numerical aperture is changed.

10. The image measuring device according to claim 8, further comprising at least two swingably supported levers, wherein said first diaphragm is provided in one of the swingably supported levers and said second diaphragm is provided in another of the swingably supported levers, and wherein the numerical aperture is changed by movement of any of the levers.

11. The image measuring device according to claim 7, wherein the numerical aperture changer comprises an iris diaphragm for successively changing the numerical aperture.

12. The image measuring device according to claim 7, wherein at least one of the front and rear lens units is changeable.

* * * * *